United States Patent [19]

Sato

[11] 4,434,444
[45] Feb. 28, 1984

[54] TAPE CASSETTE LOADING DEVICE FOR CASSETTE TAPE RECORDER

[75] Inventor: Masaaki Sato, Hachioji, Japan

[73] Assignee: Olympus Optical Company Ltd., Tokyo, Japan

[21] Appl. No.: 220,729

[22] Filed: Dec. 29, 1980

[30] Foreign Application Priority Data

Feb. 8, 1980 [JP] Japan ................................. 55-14315
Feb. 8, 1980 [JP] Japan ................................. 55-14316
Feb. 8, 1980 [JP] Japan ................................. 55-14317

[51] Int. Cl.³ .................... G11B 15/18; G11B 15/66
[52] U.S. Cl. ..................................... 360/96.5; 360/71
[58] Field of Search ............... 360/96.5, 96.6, 96.2, 360/93, 132, 71; 242/198–200; 318/431, 446

[56] References Cited

U.S. PATENT DOCUMENTS 4,308,562 12/1981 Negishi ......................... 360/96.5 X
4,320,424 3/1982 Murayama .................... 360/96.5

FOREIGN PATENT DOCUMENTS 54-106212 8/1979 Japan ................................. 360/96.5
43-80177 8/1968 Japan .

*Primary Examiner*—John H. Wolff
*Attorney, Agent, or Firm*—Weinstein & Sutton

[57] ABSTRACT

A tape cassette loading device for a cassette tape recorder comprises a brushless motor capable of immediately starting to rotate in response to an external starting drive in a direction determined by such drive and also capable of immediately stopping in response to an external braking effort. A movement of a cassette holder is transmitted through a holder drive mechanism to the motor, thereby controlling the motor.

16 Claims, 11 Drawing Figures

TAPE CASSETTE LOADING DEVICE FOR CASSETTE TAPE RECORDER

BACKGROUND OF THE INVENTION

The invention relates to a tape cassette loading device for a cassette tape recorder.

A slide-in mechanism of the Staar type is known as a device which loads a tape cassette into a cassette tape recorder. In this instance, a tape cassette is slid into the recorder from an opening formed in the front surface thereof. A pilot pin is then urged by the cassette inserted to operate a linkage, which causes a movable carriage carrying drive elements, such as a capstan or reel shafts, to be lifted into engagement with a capstan receiving aperture and tape hubs, respectively, formed in the cassette. However, the described arrangement is susceptible to oscillations since the capstan, reel shafts and their associated drive mechanisms are mounted on the moving carriage, disadvantageously causing a nonuniform rotation. To eliminate these drawbacks of the Staar type arrangement, there is proposed a tape cassette loading device which may be referred to as a fixed drive mechanism type in that the reel shafts, capstan and their drive mechanisms are mounted on a fixed substrate. In this device, when a tape cassette is inserted into a cassette receiving opening and receiving in a cassette holder, the latter moves further inward and then moves down to engage the capstan receiving aperture and tape hubs formed in the cassette with the reel shafts and the capstan mounted on the fixed substrate. This conventional arrangement requires a specific starting means associated with an electric motor which is utilized to move the cassette holder, and disadvantageously results in a complex construction and a reduced operating ease.

SUMMARY OF THE INVENTION

It is an object of the invention to provide a tape cassette loading device for a cassette tape recorder of the fixed drive mechanism type in which a brushless motor capable of immediately starting to rotate in response to an external starting drive in a direction determined by such drive and capable of immediately stopping in response to an external braking effort is used in a holder drive mechanism which is adapted to carry a cassette holder, receiving and retaining a tape cassette, in a given location, the arrangement being such that an external starting drive or braking effort is applied to the motor through the holder drive mechanism to facilitate a loading and a removal of the tape cassette.

In accordance with the invention, a brushless motor capable of immediately starting to rotate in response to an external starting drive or capable of immediately stopping in response to an external braking effort is connected to a cassette holder through a holder drive mechanism. Accordingly, when loading a tape cassette, the insertion of a tape cassette into the cassette holder and a slight manual movement of the cassette holder are all that is required to load the cassette in place. Specifically, the external starting drive is applied to the brushless motor through the holder drive mechanism, causing the motor to start its rotation. When the holder has been moved to a given cassette loading location as a result of rotation of the motor, the completion of movement of the cassette holder applies a braking effort to the brushless motor, which therefore ceases to rotate. When it is desired to remove the tape cassette from a recorder, an eject button may be operated to cause the cassette holder to move slightly. Thereupon, an external starting drive is applied to the brushless motor through the drive mechanism, thus enabling the motor to be set in motion. As a result of such rotation, the cassette holder is driven from its loading position to its cassette insertion position. The completion of the movement of the cassette holder applies a braking effort to the brushless motor, which therefore ceases to rotate. Thus, the tape cassette can be removed automatically.

DESCRIPTION OF PREFERRED EMBODIMENTS

Figure 1:
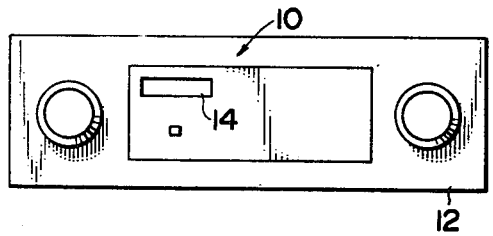
FIG. 1 is a front view of a cassette tape recorder incorporating a tape cassette loading device of the invention.
Figure 2:
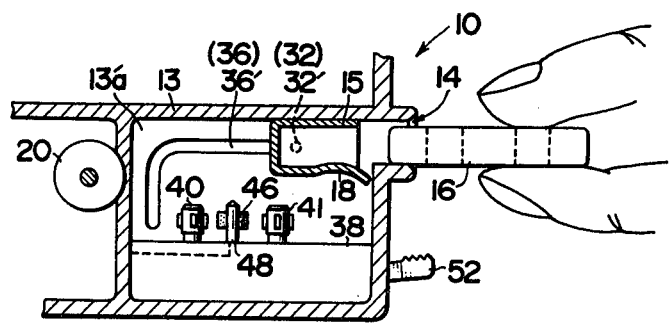
FIG. 2 is a fragmentary cross section of a tape cassette loading device according to one embodiment of the invention, illustrating the device before a tape cassette is loaded.

Referring to FIG. 1, there is shown a tape cassette loading device 10 which is assembled into a cassette tape recorder 12. It will be seen that the cassette loading device 10 has a front panel in which an opening 14 is formed to permit the insertion of a tape cassette. As shown in FIG. 2, a tape cassette 16 may be inserted into the opening 14. An open-ended box-like cassette holder 15 is disposed rearwardly of the opening 14, or to the left thereof as viewed in FIG. 2, to receive and retain the cassette 16 as it is inserted into the opening 14. Toward its forward end, the bottom of the cassette holder 15 is formed with a plurality of spring blades 18 (see FIGS. 3 and 4) for resiliently holding the cassette 16 inserted against unintended movement. The cassette loading device includes a housing 13 having a pair of opposite lateral sidewalls 13a, 13a' (see FIG. 3) in which guide slots 36, 36' are formed in an L-configuration having its horizontal limb which is contiguous with a downwardly depending limb which extends from the rear end of the former. A pair of engaging pins 32, 32' (see FIG. 4) are fixedly mounted on the outside of the sidewalls of the cassette holder 15 and engage the guide slots 36, 36' to guide the movement of the cassette holder 15. The cassette tape recorder includes a lower substrate 38 on which reel shafts 40, 41, pinch roller 46 and capstan 48 are mounted for driving and controlling the running of a cassette tape. When the cassette holder 15 carrying the cassette 16 therein moves down along the guide slots 36, 36', the reel shafts 40, 41 and the capstan 48 engage the capstan receiving aperture and tape hubs formed in the cassette 16, thus permitting the running of the cassette tape to be controlled.

Figure 3:
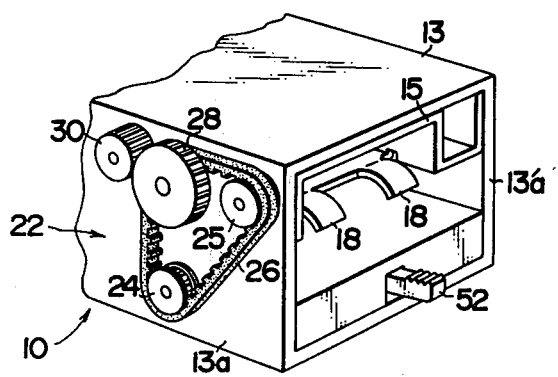
FIG. 3 is a perspective view of the tape cassette loading device shown in FIG. 2, illustrating its external components.
Figure 4:
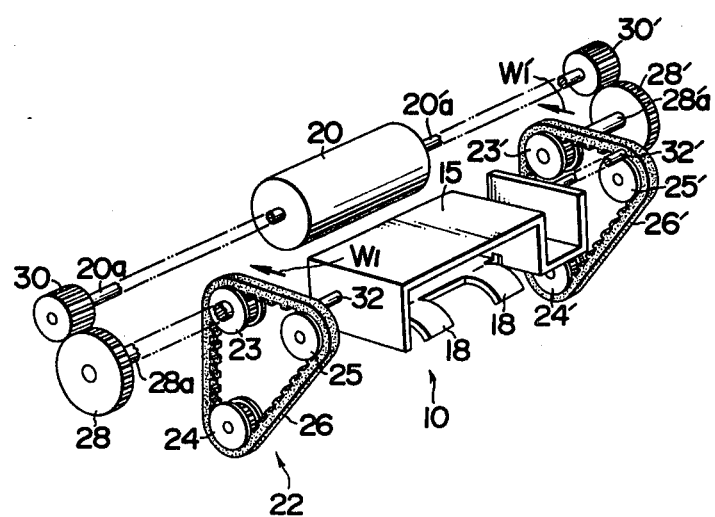
FIG. 4 is a perspective view of the tape cassette loading device of FIGS. 2 and 3, with a housing being removed from illustration.
Figure 5:
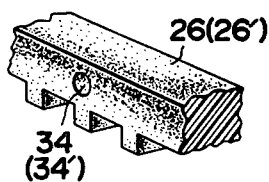
FIG. 5 is a fragmentary enlarged perspective view of an endless belt which is used in a holder drive mechanism of the loading device of the invention.
Figure 6:
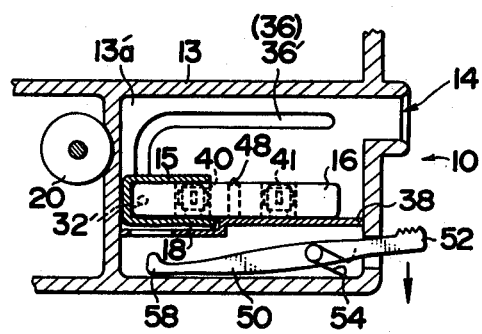
FIG. 6 is a fragmentary cross section of the tape cassette loading device of FIGS. 2 and 3, illustrating the device after the tape cassette has been loaded.

In accordance with the invention, the cassette loading device 10 employs a brushless motor 20 which is shown rearwardly and upwardly, as viewed in FIG. 2. This motor can be controlled by a brushless motor control circuit as disclosed in Japanese Laid-Open Patent Application No. 28,623/1975, and is adapted to start rotating immediately in response to an external starting drive in a direction determined by such drive and to stop immediately in response to an external braking effort. As shown in detail in FIG. 4, the motor 20 is connected to the cassette holder 15 through a holder drive mechanism 22 which comprises a plurality of gears 23, 24, 25, 28, 30; 23', 24', 25', 28', 30' and endless timing belts 26, 26'. Specifically, a pair of laterally spaced output gears 30, 30' are integrally mounted on the opposite end portions 20a, 20a' of the rotary shaft of the motor 20, and a pair of laterally spaced transmission gears 28, 28' mesh with these gears 30, 30', respectively. The transmission gears 28, 28' are mounted on shafts 28a, 28a' on which a pair of laterally spaced gears 23, 23' are integrally mounted. These gears 23, 23' mesh with a rack formed on the inside of a pair of laterally spaced endless timing belts 26, 26', which also extend around pairs of laterally spaced gears 24, 24' and 25, 25', which also mesh with these belts. As shown in FIG. 5, these endless timing belts 26, 26' are formed with an engaging apertures 34 or 34', respectively, which is in turn engaged by the engaging pin 32, 32' fixedly mounted on the sidewalls of the cassette holder 15 and extending through the guide slots 36, 36', in a manner as indicated in FIG. 4. Consequently, as the brushless motor 20 is set in motion, the drive therefrom is transmitted through the gear pairs 30, 30'; 28, 28'; 23, 23' to the endless timing belts 26, 26', the movement of which is transmitted to the cassette holder 15 through the engagement between the apertures 34, 34' and the pins 32, 32', thus causing the cassette holder 15 to move along the guide slots 36, 36'. In this manner, the cassette holder 15 is movable between a cassette insertion position illustrated in FIG. 2 and a cassette loaded position illustrated in FIG. 6. As shown in FIGS. 2 and 3, the front panel of the cassette loading device 10 is provided with an eject button 52 which is used to remove a loaded cassette. As shown in FIG. 6, the eject button 52 is formed by one end of a lever 50 which is rockably mounted on a pin which is secured to a stationary port such as the housing, and a torsion spring 54 is disposed on the pivot pin and engages one arm of the lever to urge the lever counter-clockwise, as viewed in FIG. 6, about the pivot. At this time, the lever 50 stays at rest while its other end 58 abuts against the bottom of the housing 13. When the eject button 52 is depressed downward, the lever 50 pivots clockwise against the resilience of the torsion spring 54, with the end 58 striking the bottom of the cassette holder 15 which is situated as shown in FIG. 6, thus driving it upward.

In operation, when it is desired to insert the cassette 16, it is inserted into the cassette holder 15 through the opening 14, with a slight pressure, as indicated in FIG. 2. When inserted into the holder 15, the cassette 16 is gently held by the plurality of spring blades 18, and as the cassette 16 is pushed further inward to apply a driving force to the holder 15, the latter moves inward along the guide slots 36, 36'. Such movement of the holder 15 is transmitted through the pins 32, 32' to the timing belts 26, 26' of the holder drive mechanism 22, thus driving the belts 26, 26' in directions indicated by arrows w1, w1' shown in FIG. 4. Such movement of the belts 26, 26' is effective to rotate the gears 23, 23' and 28, 28' counter-clockwise and to rotate, in turn, gears 30, 30' clockwise, thus applying a starting drive to the rotary shaft ends 20a, 20a' of the motor 20. In response thereto, the motor 20 is immediately set in motion, whereby the transmission through the gears 30, 30'; 28, 28'; 23, 23' of the drive from the rotating motor 20 continues to drive the belts 26, 26' in the directions of arrows w1, w1', causing the cassette holder 15 which carries the cassette 16 therein further inward along the guide slots 36, 36'. As mentioned previously, the rear portion of the guide slots 36, 36' is bent to extend downwardly in the manner of a letter L, and the belts 26, 26' are bent in a similar configuration. Hence, when the cassette holder 15 moves rearwardly from the insertion position shown in FIG. 2, it is then driven downward to reach the position shown in FIG. 6 where the guide slots 36, 36' terminate, thus preventing a further downward movement of the holder 15. Consequently, a further movement of the belts 26, 26' is interrupted as is the rotation of the gear pairs 23, 23'; 28, 28'; 30, 30'. Consequently, a braking effort is applied to the shaft ends 20a, 20a' of the motor 20 to stop its rotation. It will be appreciated from the foregoing description that when the cassette holder 15 reaches the position shown in FIG. 6, the cassette 16 carried therein is located so that the tape hubs and the capstan receiving apertures formed therein are fitted over the reel shafts 40, 41 and the capstan shaft 48, respectively, which are disposed on the substrate 38, whereby the apparatus is ready to operate.

Figure 7:
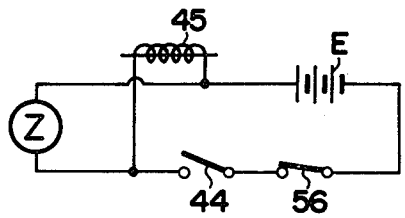
FIG. 7 is a circuit diagram of an electrical circuit which is used in the cassette tape recorder of FIG. 1.
Figure 8:
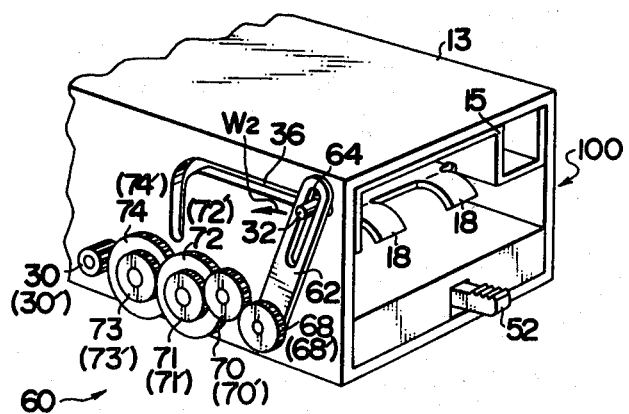
FIG. 8 is a perspective view of a tape cassette loading device according to another embodiment of the invention.

FIG. 7 shows an electrical circuit which is used in the cassette tape recorder 12 shown in FIG. 1. It includes a power source E, a pair of series connected switches 44, 56, and a solenoid 45 connected in shunt with a load Z such as a tape driving motor or record/playback amplifier connected between the source E and the switch 44. The switch 44 has a make contact while the switch 56 has a break contact. The switch 44 is turned on when the cassette 16, as inserted into the holder 15, reaches the position of FIG. 6 as a result of the drive from the motor 20 and holder drive mechanism 22. At this time, the circuit is completed to energize the solenoid 45 and the load Z from the source E. The energization of the solenoid 45 is effective to operate a mechanism, not shown, which causes the pinch roller 46 and a magnetic head (not shown) to move into contact with the tape contained in the cassette 16 for record/playback operation. As mentioned previously, the load Z represents a record/playback amplifier or motor, and is maintained energized when the switch 44 is turned on.

What has been described above is the operation which occurs when the cassette 16 is inserted. Considering now the operation which occurs when the cassette 16 which has been inserted as shown in FIG. 6 is removed, it is initiated when the eject button 52 is depressed downward. Thereupon, the other end 58 of the eject lever strikes against the bottom surface of the cassette holder 15, thus driving it upward. This upward drive is transmitted through the holder drive mechanism 22 to the shaft ends 20a, 20a' of the motor 20, which therefore starts to rotate. Thus, as the cassette holder 15 is driven upward, the drive is transmitted through the pins 32, 32' to move the timing belts 26, 26' in opposite directions from those indicated by arrows w1, w1' shown in FIG. 4, whereby the gear pairs 23, 23'; 28, 28' rotate clockwise while the gear pair 30, 30' rotates counter-clockwise. The counter-clockwise rotation of the gear pairs 30, 30' imparts a counter-clockwise starting drive to the shaft ends 20a, 20a' of the brushless motor 20, which therefore immediately rotates in the counter-clockwise direction. As the motor 20 rotates in this manner, the drive therefrom is transmitted through the holder drive mechanism 22 to move the cassette holder 15 along the guide slots 36, 36', initially upward and then forwardly, thus moving it from the loaded position shown in FIG. 6 to the cassette insertion position shown in FIG. 2. When the cassette holder 15 reaches the position shown in FIG. 2, the guide slots 36, 36' terminate, and hence the holder 15 cannot continue to move any further and thus comes to a stop. The stop causes a braking effort to be applied to the shaft ends 20a, 20a' of the motor through the holder drive mechanism 22, thus causing the motor 20 to stop its rotation. In the manner mentioned above, the cassette holder 15 is moved from the loaded position shown in FIG. 6 to the insertion position shown in FIG. 2 where the cassette 16 carried by the cassette holder 15 is caused to project out of the opening 14 so that the free end thereof can be gripped by hand to remove it. During the eject operation, the switch 56 shown in FIG. 7 is opened in response to the depression of the eject button 52, thus deenergizing the solenoid 45 and the load Z such as an amplifier or a tape drive motor. When the solenoid 45 is deenergized, the pinch roller 46 and magnetic head move away from their positions abutting against the tape in the cassette 16, to their original positions.

Figure 9:
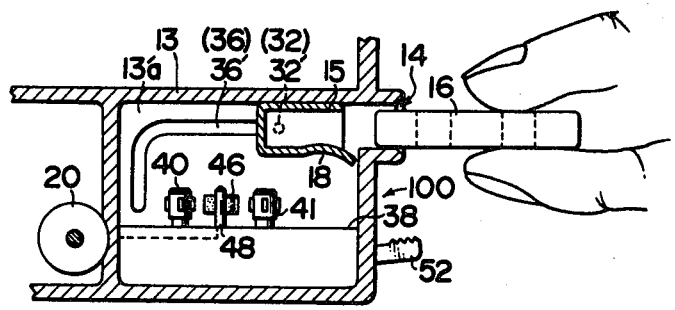
FIG. 9 is a fragmentary cross section of the tape cassette loading device of FIG. 8 before a cassette is loaded.
Figure 10:
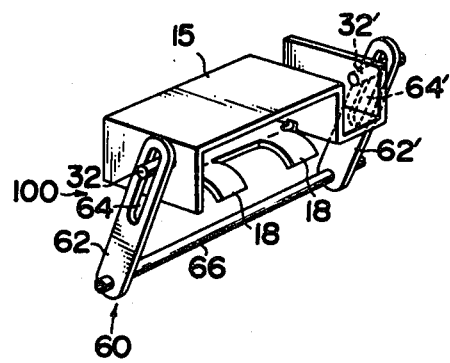
FIG. 10 is a fragmentary perspective view of the cassette loading device of FIGS. 8 and 9, with a housing being removed.
Figure 11:
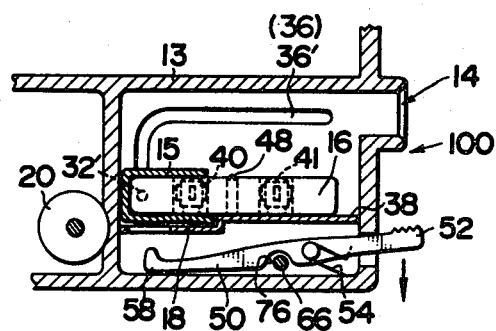
FIG. 11 is a fragmentary cross section of the tape cassette loading device of FIGS. 8 and 9 after a cassette has been loaded in place.

FIGS. 8 to 11 illustrate another embodiment of the invention which employ a holder drive mechanism 60 including a pair of holder drive arms 62, 62' which are substituted for the pair of endless belts 26, 26' used in the initial embodiment. Specifically, in a cassette loading device 100 illustrated in FIGS. 8 to 11, a pair of engaging pins 32, 32' fixedly mounted on the outside of the lateral sidewalls of a cassette holder 15 engage elongate slots 64, 64', respectively, which are formed in one end of a pair of holder driving arms 62, 62', the other end of which is integrally connected to the opposite ends of a connecting shaft 66, on which a pair of gears 68, 68' are integrally mounted. The gears 68, 68' are in meshing engagement with a pair of gears 30, 31' integrally mounted on the rotary shaft of a brushless motor 20, through a reduction gear train including a plurality of gears 70-74, 70'-74'. In this manner, the drive from the motor 20 is transmitted to the arms 62, 62', or the movement of the arms 62, 62' is transmitted to the motor shaft. Components other than the arms 62, 62', the shaft 66, gear pairs 68, 68'; 70-74, 70'-74' remain the same as those illustrated in the loading device 10 shown in FIGS. 1 to 7. As shown in FIGS. 9 and 11, the location of the motor 20 is lower than the position shown in the first embodiment and the eject lever 50 is formed with a notch 76 (see FIG. 11) in its arm remote from the eject button 52 to avoid interference with the connecting shaft 66.

The operation of the cassette loading device 100 is substantially similar to that of the cassette loading device 10 shown in FIGS. 1 to 7, the only difference being that the arms 62, 62' acting in place of the belts 26, 26'. Initially, when a cassette is to be inserted, the cassette 16 is inserted into the holder 15 through the opening 14 as indicated in FIG. 9, and the cassette 16 is then further pushed inward to drive the holder 15, whereupon the latter moves inward along the guide slots 36, 36' and such movement is transmitted through the arms 62, 62' to the gears 68, 68' and thence through the gears 70-74, 70'-74' to the gears 30, 30' which are mounted on the rotary shaft of the motor 20, thus applying a starting drive thereto. In response thereto, the motor 20 immediately starts to rotate. The resulting rotation is oppositely transmitted through the gear pairs 30, 30'; 74-70, 74'-70'; 68, 68' to the arms 62, 62', driving the latter counter-clockwise as indicated by an arrow w2 (see FIG. 8). As a consequence, the cassette holder 15 is driven further inward along the guide slots 36, 36' as a result of their pins 32, 32' engaging the elongate slots 64, 64' formed in these arms 62, 62'. Subsequently, the holder 15 is driven downward until a loaded position shown in FIG. 11 is reached. As the cassette holder 15 reaches such position and becomes unable to move any further, a braking effort is applied to the rotary shaft of the motor 20, which therefore immediately ceases to rotate.

When the cassette 16 which is loaded in this manner is to be removed, the eject button 52 is depressed to drive the cassette holder 15 slightly upward. Thereupon, this movement is transmitted through the pins 32, 32', the arms 62, 62', the gear pairs 68, 68'; 70-74, 70'-74'; 30, 30' to the rotary shaft of the motor 20, applying a starting drive thereto to cause the motor 20 to be set in motion. The resulting drive from the motor 20 is transmitted through the gear pairs 30, 30'; 74-70, 74'-70'; 68, 68' to the arms 62, 62', driving the arms 62, 62' clockwise. The rotation of the arms 62, 62' is transmitted to the cassette holder 15 through the pins 32, 32', and consequently the holder can be moved from the loaded position shown in FIG. 11 to the cassette insertion position shown in FIG. 9. When the cassette holder 15 reaches the position shown in FIG. 9 and comes to a stop, a braking effort is applied to the motor 20, which therefore ceases to rotate. In other respects, the operation of the cassette loading device 100 is similar to that of the loading device 10.

As described above, in the cassette loading device of the invention, a brushless motor is used which is capable of immediately starting to rotate in response to an externally applied starting drive in a direction determined by such drive and is also capable of immediately stopping in response to an external braking effort applied. A movement of the cassette holder which carries the cassette therein is transmitted to the motor through cassette drive mechanism, thus controlling the motor in both cassette loading and removing operations. It will be seen that no particular motor starting means is required. In addition, advantages are gained in that operating performance is improved and the construction is simplified, enabling it to be inexpensively manufactured and making it trouble free.

What is claimed is:

1. A tape cassette loading device comprising:

a cassette holder for receiving and retaining a tape cassette and movable between a first position in which the cassette is inserted into the cassette holder and a second position in which the cassette is in operative engagement with a tape drive;

a holder drive mechanism and first means (32) for connecting said holder drive mechanism to said cassette holder for moving it between said first position and said second position;

a brushless motor including a rotary shaft and second means for connecting said motor and rotary shaft to said holder drive mechanism for driving same, said motor being capable of initiating rotation in response to an external starting drive applied to said rotary shaft and being capable of stopping in response to an external braking effort being applied to said rotary shaft;

said cassette holder being movable from said first position toward said second position upon receipt of said tape cassette and said first connecting means transmitting said movement to said holder drive mechanism to develop said external starting drive;

said second connecting means transmitting said external starting drive to said rotary shaft and motor;

said motor and said holder drive mechanism cooperating to complete the movement of said cassette holder to said second position;

means for stopping said holder drive mechanism when said cassette holder reaches said second position and being effective to apply a braking effort to said rotary shaft of said motor to stop said motor;

means for moving said cassette holder from said second position toward said first position for imparting said external starting drive in the form of a mechanical force to rotate said rotary shaft and thereby actuate said motor; and said motor and drive mechanism cooperating to complete the movement of said cassette holder to said first position.

2. A cassette loading device according to claim 1 in which the holder drive mechanism comprises an endless timing belt connected with an engaging pin formed on the cassette holder, a gear meshing with a toothed surface on the belt, an output gear integrally mounted on the rotary shaft of motor and disposed in meshing engagement with the gear, and a guide slot through which the engaging pin extends, the guide slot being configured to guide the cassette holder to a given position.

3. A cassette loading device according to claim 1 in which the holder drive mechanism comprises a holder driving arm connected to an engaging pin formed on the cassette holder, a gear integrally mounted on the pivot of the arm, an output gear integrally mounted on the rotary shaft of the motor and disposed in meshing engagement with the gear, and a guide slot through which the engaging pin extends, the guide slot being configured to guide the cassette holder to a given position.

4. A tape cassette loading device in accordance with claim 1, further including eject means being operable to cause movement of said cassette holder from said second position, said holder drive mechanism transmitting said movement to the rotary shaft of said motor to actuate said motor to move said cassette holder to said first position, at which an external braking effort is applied to the rotary shaft of said motor, causing it to stop.

5. A tape cassette loading device comprising:

a cassette holder for receiving and retaining a tape cassette therein and movable between a first position in which the cassette is inserted into the cassette holder and a second position in which the cassette is in operative engagement with a tape drive;

a holder drive mechanism connected to said cassette holder for moving said cassette holder;

a brushless motor including a rotary shaft connected to said drive mechanism and capable of initiating rotation in response to an external starting drive applied to said rotary shaft;

means responsive to movement of said cassette holder from said first position toward said second position due to insertion of said cassette to impart said external starting drive in the form of a mechanical force to said drive mechanism to rotate said rotary shaft and thereby actuate said motor;

said drive mechanism and said motor cooperating to complete the movement of said cassette holder to said second position;

means for moving said cassette holder from said second position toward said first position for imparting said external starting drive in the form of a mechanical force to rotate said rotary shaft and thereby actuate said motor; and said motor and drive mechanism cooperating to complete the movement of said cassette holder to said first position.

6. A tape cassette loading device according to claim 5 said drive mechanism further including guide means for guiding the movement of said cassette holder between said first position and said second position.

7. A tape cassette loading device according to claim 4 further including an eject means for causing a slight movement of said cassette holder from said second position toward said first position.

8. A tape cassette loading device according to claim 4 wherein said means for moving said holder toward said first position includes an eject member for causing a slight movement of said holder from said second position toward said first position.

9. A tape cassette loading device according to claim 4 or 5 wherein said motor is capable of immediately stopping in response to an external braking effort applied to said rotary shaft and means for applying said external braking effort to deactive said motor upon the completion of movement of said cassette holder to said first or second position.

10. A tape cassette loading device according to claim 9 further including guide means operating to apply said external braking effort.

11. A tape cassette loading device according to claim 4 wherein said means to impart includes pins connected to said cassette holder.

12. A tape cassette loading device comprising:

a cassette holder for receiving and retaining a tape cassette therein and movable between a first position in which the cassette is inserted into the cassette holder and a second position in which the cassette is in operative engagement with a tape drive;

a drive mechanism connected to said cassette holder for moving said cassette holder;

a brushless motor including a rotary shaft connected to said drive mechanism and capable of initiating rotation in response to an external starting drive applied to said rotary shaft;

said motor and said drive mechanism cooperating to complete the movement of said cassette holder to said second position after said cassette holder has been moved from said first position toward said second position by an external force which is imparted to said drive mechanism to actuate said motor;

means for moving said cassette holder from said second position toward said first position for imparting said external starting drive in the form of a mechanical force to rotate said rotary shaft and thereby actuate said motor; and said motor and drive mechanism cooperating to complete the movement of said cassette holder to said first position.

13. A tape cassette loading device according to claim 12 said drive mechanism further including guide means for guiding the movement of said cassette holder between said first position and second position.

14. A tape cassette loading device according to claim 12 said drive mechanism further including means responsive to movement of said cassette holder from said first position toward said second position due to insertion of said cassette for imparting a mechanical force to said rotary shaft to actuate said motor; and said motor and drive mechanism operating to complete the movement of said cassette holder towards said second position.

15. A tape cassette loading device according to claim 12 wherein said moving means includes an eject member for causing a slight movement of said cassette holder from said second position toward said first position.

16. A tape cassette loading device according to claim 12 or 13 wherein said motor is capable of immediately stopping in response to an external braking effort applied to said rotary shaft and means for applying said external braking effort to deactivate said motor upon the completion of movement of said cassette holder to said first or second position.

* * * * *

UNITED STATES PATENT AND TRADEMARK OFFICE
CERTIFICATE OF CORRECTION

PATENT NO. : 4,434,444

DATED : February 28, 1984

INVENTOR(S) : Masaaki Sato

It is certified that error appears in the above-identified patent and that said Letters Patent is hereby corrected as shown below:

Column 1, line 27, change "receiving" (2nd occurr.) to --received--.

Column 3, line 41, change "apertures" to --aperture--.

Column 6, line 7, change "acting" to --act--.

In the Claims:

Claim 7, column 8, line 35, change "4" to --5--.

Claim 8, column 8, line 39, change "4" to --5--.

Claim 9, column 8, line 44, change "4 or 5" to --5 or 6--.

Claim 11, column 8, line 54, change "4" to --5--.

Signed and Sealed this

Eighth Day of January 1985

[SEAL]

Attest:

GERALD J. MOSSINGHOFF

Attesting Officer

*Commissioner of Patents and Trademarks*